United States Patent
Chan et al.

(10) Patent No.: US 11,196,247 B1
(45) Date of Patent: Dec. 7, 2021

(54) DIGITAL DEVICE USING THREE STATES

(71) Applicants: Dyna Image Corporation, New Taipei (TW); Lite-On Semiconductor Corp., Taipei (TW)

(72) Inventors: Peng-Han Chan, New Taipei (TW); Chun-Hsien Lin, New Taipei (TW); Sheng-Cheng Lee, New Taipei (TW); Wen-Sheng Lin, New Taipei (TW); Yu-Cheng Su, New Taipei (TW)

(73) Assignees: Dyna Image Corporation, New Taipei (TW); Lite-On Semiconductor Corporation, Taipei (TW)

( * ) Notice: Subject to any disclaimer, the term of this patent is extended or adjusted under 35 U.S.C. 154(b) by 0 days.

(21) Appl. No.: 17/073,624

(22) Filed: Oct. 19, 2020

(51) Int. Cl.
| | | |
|---|---|---|
| *H03K 19/013* | (2006.01) | |
| *H04L 25/02* | (2006.01) | |
| *H02H 9/02* | (2006.01) | |
| *H02H 3/02* | (2006.01) | |
| *H02H 9/04* | (2006.01) | |

(52) U.S. Cl.
CPC ............ *H02H 9/023* (2013.01); *H02H 3/023* (2013.01); *H02H 3/025* (2013.01); *H02H 9/041* (2013.01)

(58) Field of Classification Search
CPC ........ H02H 9/023; H02H 3/023; H02H 3/025; H02H 9/041; H03K 19/01
See application file for complete search history.

(56) References Cited

U.S. PATENT DOCUMENTS

| | | | | |
|---|---|---|---|---|
| 7,157,931 B2* | 1/2007 | Song | ................... | H04L 25/0298 326/30 |
| 8,072,235 B2* | 12/2011 | Nguyen | ............... | H04B 1/0458 326/30 |
| 8,466,709 B2* | 6/2013 | Nguyen | ............... | H04B 1/0458 326/30 |
| 8,866,529 B2* | 10/2014 | Wu | .......................... | H03F 3/45 327/320 |
| 2018/0277196 A1* | 9/2018 | Gu | ....................... | G11C 7/1066 |

* cited by examiner

*Primary Examiner* — Jared Fureman
*Assistant Examiner* — Nicolas Bellido
(74) *Attorney, Agent, or Firm* — JCIPRNET

(57) ABSTRACT

A digital device is provided. The digital device uses three states, including a ground (GND) state, a voltage (VDD) state, and a FLOAT state. On designing a chip, two storage units and a pad circuit are set inside; the pad circuit comprises a current limiter and two switches; and less ports contained are required than the conventional. That is, one port obtains three states. As comparing to the conventional having only two states, the present invention uses the port connected with two storage units in the pad circuit for obtaining the three states; a circuit featuring "pull up" and "pull down" is used to identify the state of connection of the port; and the port determines a plurality of definitions through the three states of GND, VDD and FLOAT. Thus, a pad is saved for reducing the space and cost of the chip.

6 Claims, 3 Drawing Sheets

DIGITAL DEVICE USING THREE STATES

TECHNICAL FIELD OF THE INVENTION

The present invention relates to a digital device; more particularly, to a circuit featuring "pull up" and "pull down" for identifying states of connection of a port, where the port determines a plurality of definitions through the three states of connection of ground (GND), voltage (VDD) and FLOAT.

DESCRIPTION OF THE RELATED ARTS

Image sensors are widely used in electronic devices. With the miniaturization of electronic device, the chip area of image sensor also needs to be reduced. For reducing the chip area, the number of pins is one of the important determinants. The pins inside the chip occupy generally large space, greater than the circuit area in average. An extra pad means an extra square area. Traditionally, a digital practice has two states: a pin has only two states of 0 and 1. It results in a large number of pads being set. Therefore, it is also considered as the reason for the increasing overall circuit area and the increasing burden on the manufacturing cost.

Since the circuit board space is compact, it is required to save space as much as possible for other valuable functions. However, the above traditional design method not only consumes space and costs more; but also, obviously, wastes a lot of valuable space on the circuit board. Hence, the prior arts do not fulfill all users' requests on actual use.

SUMMARY OF THE INVENTION

The main purpose of the present invention is to using a circuit featuring "pull up" and "pull down" for identifying states of connection of a port, where the port determines a plurality of definitions through the three condition states of GND, VDD and FLOAT; and, thus, a pad is saved for reducing the space and cost of the chip.

To achieve the above purposes, the present invention is a digital device using three states, comprising a pad circuit, a first storage unit, and a second storage unit, where the pad circuit comprises a first switch; a power current limiter being coupled between VDD and the first switch; a second switch; and a ground current limiter being coupled between GND and the second switch; where the first and second switches are co-connected to a port; the port determines three configurations with three states consisting of a GND state, a VDD state, and a FLOAT state; the power current limiter is a pull-up one of the port and the ground current limiter is a pull-down one of the port; and the pad circuit has the port with a pull-up path to VDD and a pull-down path to GND; where the first storage unit connects to the pad circuit to read and store one of the configurations of the port with the pull-up path of the port to VDD; the second storage unit connects to the pad circuit to read and store one of the configurations of the port with the pull-down path of the port to GND; and where, after the pad circuit switches the pull-up path and the pull-down path through the first and second switches, values stored in the first and second storage units generate three combinations of the values stored to determine a plurality of definitions of the port out of the states of three possible connection to the port.

Accordingly, a novel digital device using three states is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
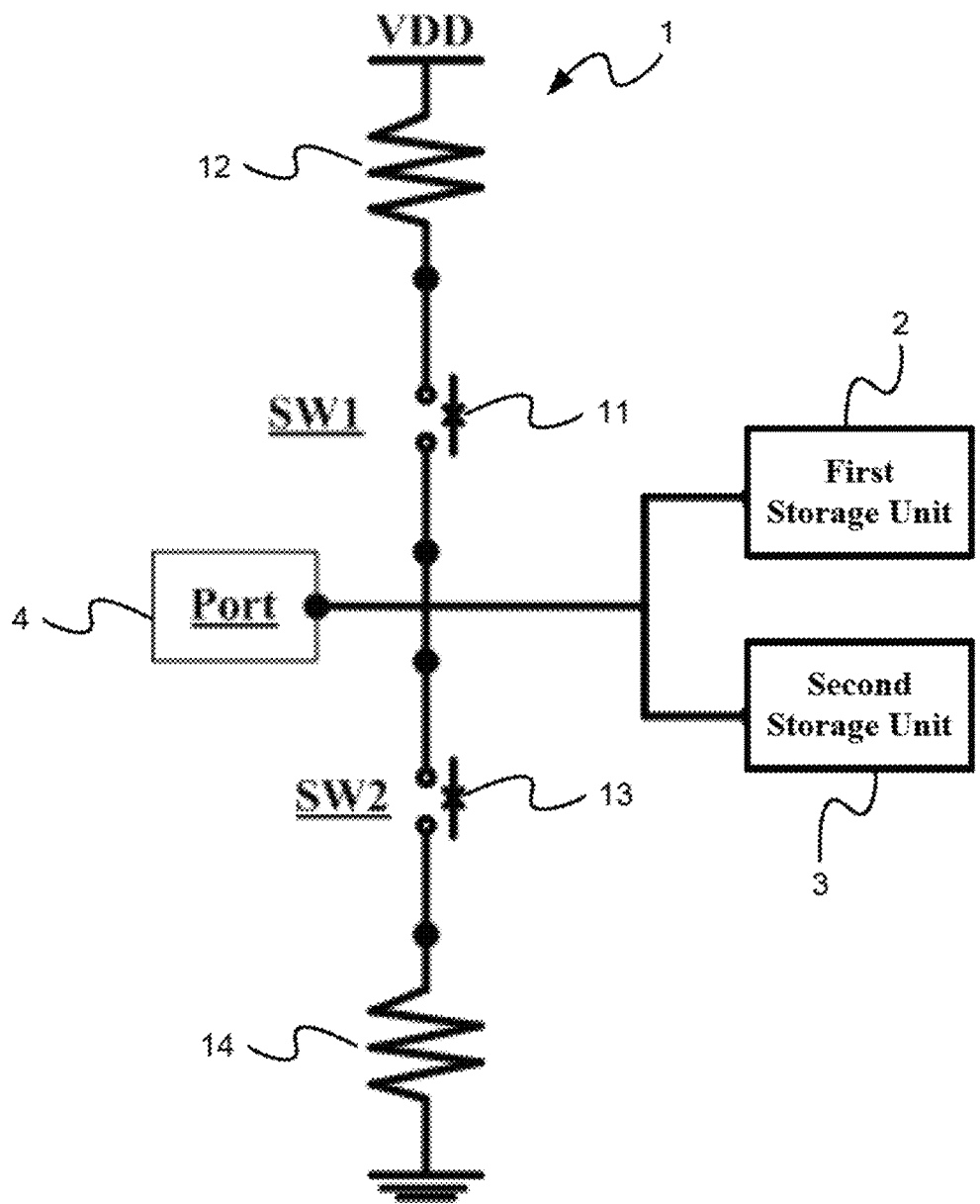
FIG. 1 is the circuit view showing the preferred embodiment according to the present invention.
Figure 2:
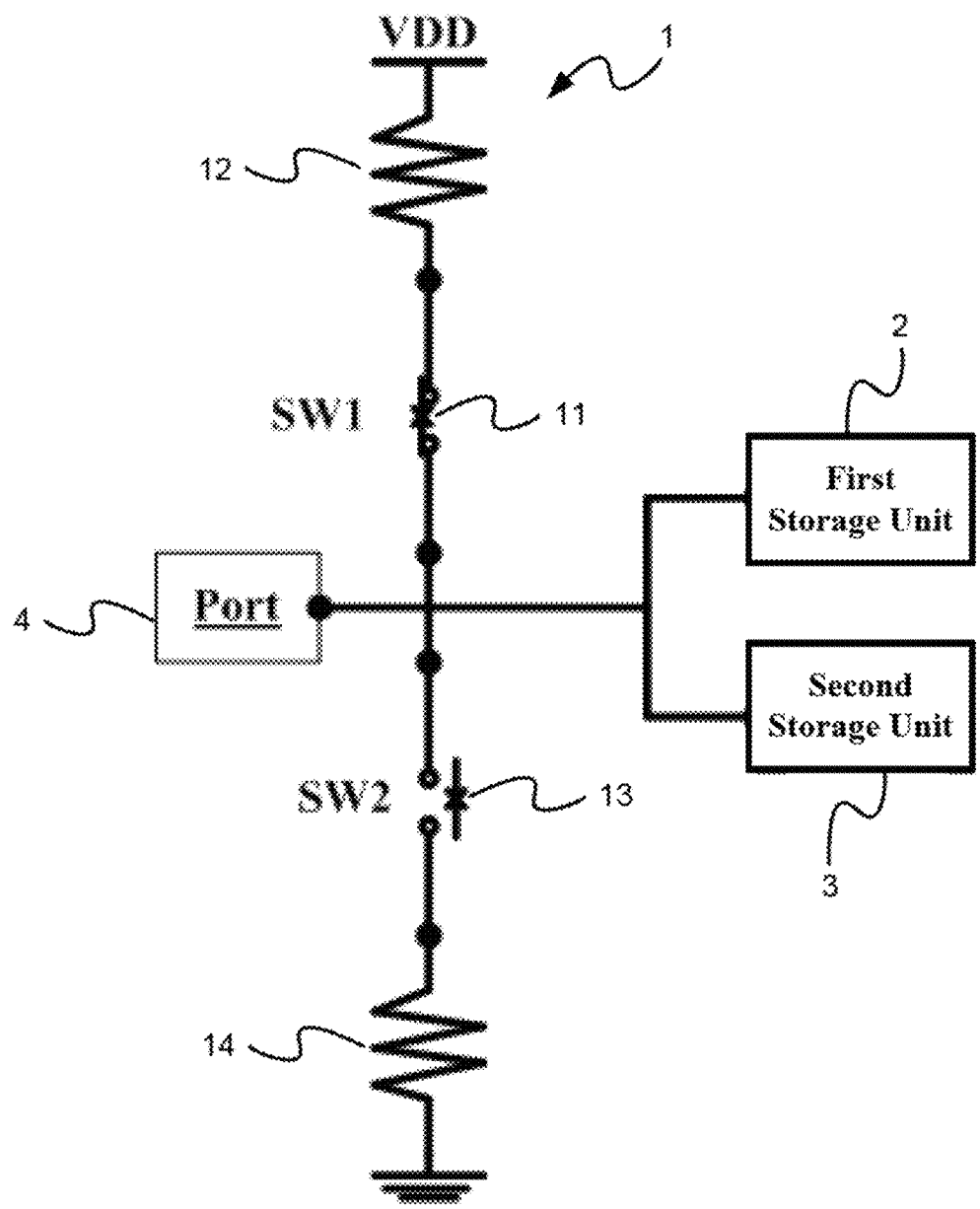
FIG. 2 is the circuit view showing the pull up state.
Figure 3:
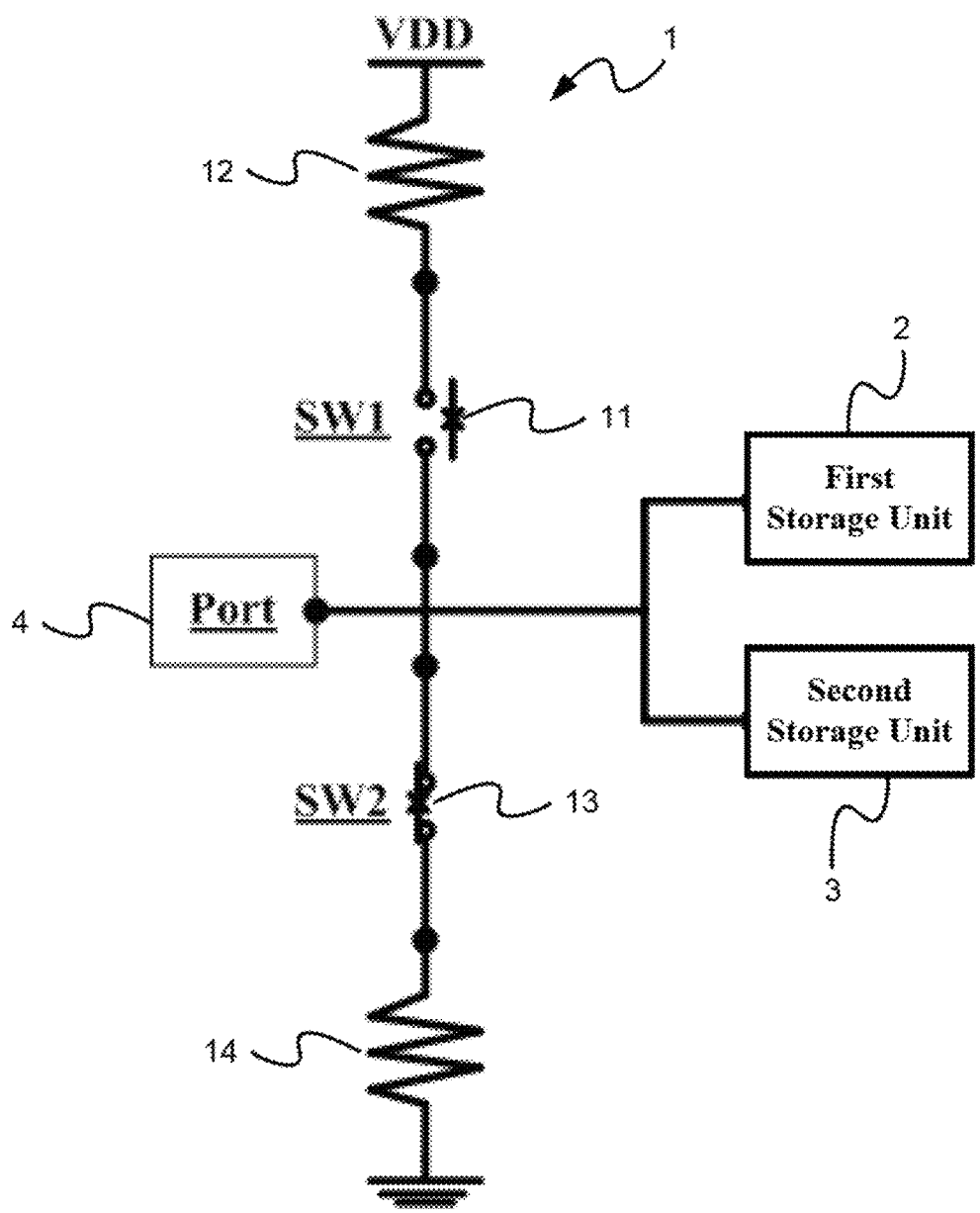
FIG. 3 is the circuit view showing the pull down state.

Please refer to FIG. 1 to FIG. 3, which are a circuit view showing a preferred embodiment according to the present invention; a circuit view showing a pull up state; and a circuit view showing a pull down state. As shown in the figures, the present invention is a digital device using three states, comprising a pad circuit 1, a first storage unit 2, and a second storage unit 3.

The pad circuit 1 comprises a first switch 11; a power current limiter 12 being coupled between VDD and the first switch 11; a second switch 13; and a ground current limiter 14 being coupled between GND and the second switch 13. The first and second switches 11, 13 co-connect to a port 4, where the port 4 determines three configurations with three states consisting of a ground (GND) state, a voltage (VDD) state, and a FLOAT state; the power current limiter 12 is a pull-up one of the port 4 and the ground current limiter 14 is a pull-down one of the port 4; and the pad circuit 1 has the port 4 with a pull-up path to VDD and a pull-down path to GND.

The first storage unit 2 connects to the pad circuit 1 to read and store a configuration of the port 4 with the pull-up path of the port 4 to VDD.

The second storage unit 3 connects to the pad circuit 1 to read and store a configuration of the port 4 with the pull-down path of the port 4 to GND. After the pad circuit 1 switches the pull-up and pull-down paths through the first and second switches 11, 13, values stored in the first and second storage units 2, 3 generate three combinations of the values stored to determine a plurality of definitions of the port 4 owing to three possible states of connection to the port 4. Thus, a novel digital device using three states is obtained.

In the beginning, the first and second switches (SW1, SW2) 11, 13 remain in an off state by default when not driven to avoid current consumption. The first storage unit 2 and the second storage unit 3 remain in a disabled state by default when not driven without executing any process, as shown in FIG. 1.

On processing a first control with the pad circuit 1 switching to the pull-up path of the port 4 to VDD through the first switch 11, the first switch 11 is in a short-circuit state; the first storage unit 2 is in an enabled state; the second switch 13 is in an off state; and the second storage unit 3 is in a disabled state without executing any process. Therein, the first storage unit 2 directly reads and stores the configuration of the port 4. If the state of connection of the port 4 is read as a state of connection to VDD, the first storage unit 2 is stored with 1; if the state of connection of the port 4 is read as a state of connection to GND, the first storage unit 2 is stored with 0; and if the state of connection of the port 4 is read as a state of connection of FLOAT, the first storage unit 2 is stored with 1, as shown in FIG. 2 and Table 1.

TABLE 1

| | State of port | | |
|---|---|---|---|
| | VDD | GND | FLOAT |
| First storage unit | 1 | 0 | 1 |

On processing a second control with the pad circuit 1 switching to the pull-down path of the port 4 to GND through the second switch 13, the first switch 11 is in an off state; the first storage unit 2 is in a disabled state without executing any process; the second switch 13 is in a short-circuit state; and the second storage unit 3 is in an enabled state. Therein, the second storage unit 3 directly reads and stores the configuration of the port 4. If the state of connection of the port 4 is read as a state of connection to VDD, the second storage unit 3 is stored with 1; if the state of connection of the port 4 is read as a state of connection to GND, the second storage unit 3 is stored with 0; and if the state of connection of the port 4 is read as a state of connection of FLOAT, the second storage unit 3 is stored with 0, as shown in FIG. 3 and Table 2.

TABLE 2

| | State of port | | |
|---|---|---|---|
| | VDD | GND | FLOAT |
| Second storage unit | 1 | 0 | 0 |

When the pad circuit 1 switches to the pull-up path through the first switch 11, the first storage unit 2 directly reads and stores the configuration of the port 4. When the pad circuit 1 switches to the pull-down path through the second switch 13, the second storage unit 3 directly reads and stores the configuration of the port 4. It can be found that the stored values of the first and second storage units 2, 3 have three possible combinations. If the state of connection is to VDD, both of 1's are stored; to GND, both of 0's; and, FLOAT, 1 and 0. Hence, with the combinations of the stored values of the first and second storage units 2,3 shown in Table 3, it is known which one of VDD, GND, and FLOAT it is for the port 4 connects to. Thus, the different combinations of stored values of the first and second storage units 2,3 can determines a plurality of definitions of the port 4.

TABLE 3

| | State of port | | |
|---|---|---|---|
| | VDD | GND | FLOAT |
| First storage unit (Pull up) | 1 | 0 | 1 |
| Second storage unit (Pull down) | 1 | 0 | 0 |

The present invention uses circuit characteristics of pull-up and pull-down to identify the states of connection of a port, where the port determines a plurality of definitions through three states of GND, VDD and FLOAT.

If a switch switches a pad circuit to a pull-up power current limiter, the pull-up power current limiter protects the port and the port determines a connection to GND at the moment.

If the switch switches the pad circuit to a pull-down ground current limiter, the pull-down ground current limiter protects the port and the port determines a connection to VDD at the moment.

If the port does not connect to VDD or GND, FLOAT is determined.

Thus, the present invention provides a digital device using the three states of VDD, GND, and FLOAT. On designing a chip, two current limiters (e.g. resistor, diode, current source . . . ), two switches, and two storage units (e.g. latch, register, capacitor, memory . . . ) are set inside to obtain three states of a port, which means ports required for the conventional is possible to become fewer. As comparing to the conventional port having only two states, the present invention only connects two storage units to the port for a pad circuit to obtain the three states with one pad saved to reduce the space and cost of the chip.

To sum up, the present invention is a digital device using three states, where a circuit featuring "pull up" and "pull down" is used to identify the state of connection of a port; the port determines a plurality of definitions through the three states of condition of GND, VDD and FLOAT; and, thus, a pad is saved for reducing the space and cost of a chip.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A digital device using three states, comprising
a pad circuit, said pad circuit comprising
  a first switch;
  a power current limiter being coupled between VDD and said first switch;
  a second switch; and
  a ground current limiter being coupled between GND and said second switch,
  wherein said first and second switches are co-connected to a port; said port determines three configurations with three states consisting of a ground (GND) state, a voltage (VDD) state, and a FLOAT state; said power current limiter is a pull-up one of said port and said ground current limiter is a pull-down one of said port; and said pad circuit has said port with a pull-up path to VDD and a pull-down path to GND;
a first storage unit, said first storage unit connecting to said pad circuit to read and store one of said configurations of said port with said pull-up path of said port to VDD; and
a second storage unit, said second storage unit connecting to said pad circuit to read and store one of said configurations of said port with said pull-down path of said port to GND,
wherein, after said pad circuit switches said pull-up path and said pull-down path through said first and second switches, values stored in said first and second storage units generate three combinations of said values stored to determine a plurality of definitions of said port out of said states of three possible connection to said port.

2. The digital device according to claim 1,
wherein said first and second switches remain in an off state by default when not driven; and said first and second storage units remain in a disabled state by default when not driven.

3. The digital device according to claim 1,
wherein, when said pad circuit switches to said pull-up path of said port to VDD, said first switch is in a short-circuit state; said first storage unit is in an enabled state; said second switch is in an off state; said second storage unit is in a disabled state; and said first storage unit reads and stores one of said configurations of said port.

4. The digital device according to claim 1, wherein, when said pad circuit switches to said pull-down path of said port to GND, said first switch is in an off state; said first storage unit is in a disabled state; said second switch is in a short-circuit state; said second storage unit is in an enabled state; and said second storage unit reads and stores one of said configurations of said port.

5. The digital device according to claim 1, wherein, each of said power current limiter and said ground current limiter is selected from a group consisting of a resistor, a diode, and a current source.

6. The digital device according to claim 1, wherein, each of said first storage unit and said second storage unit is selected from a group consisting of a latch, a register, a capacitor, and a memory.

* * * * *